United States Patent Office 3,378,949
Patented Apr. 23, 1968

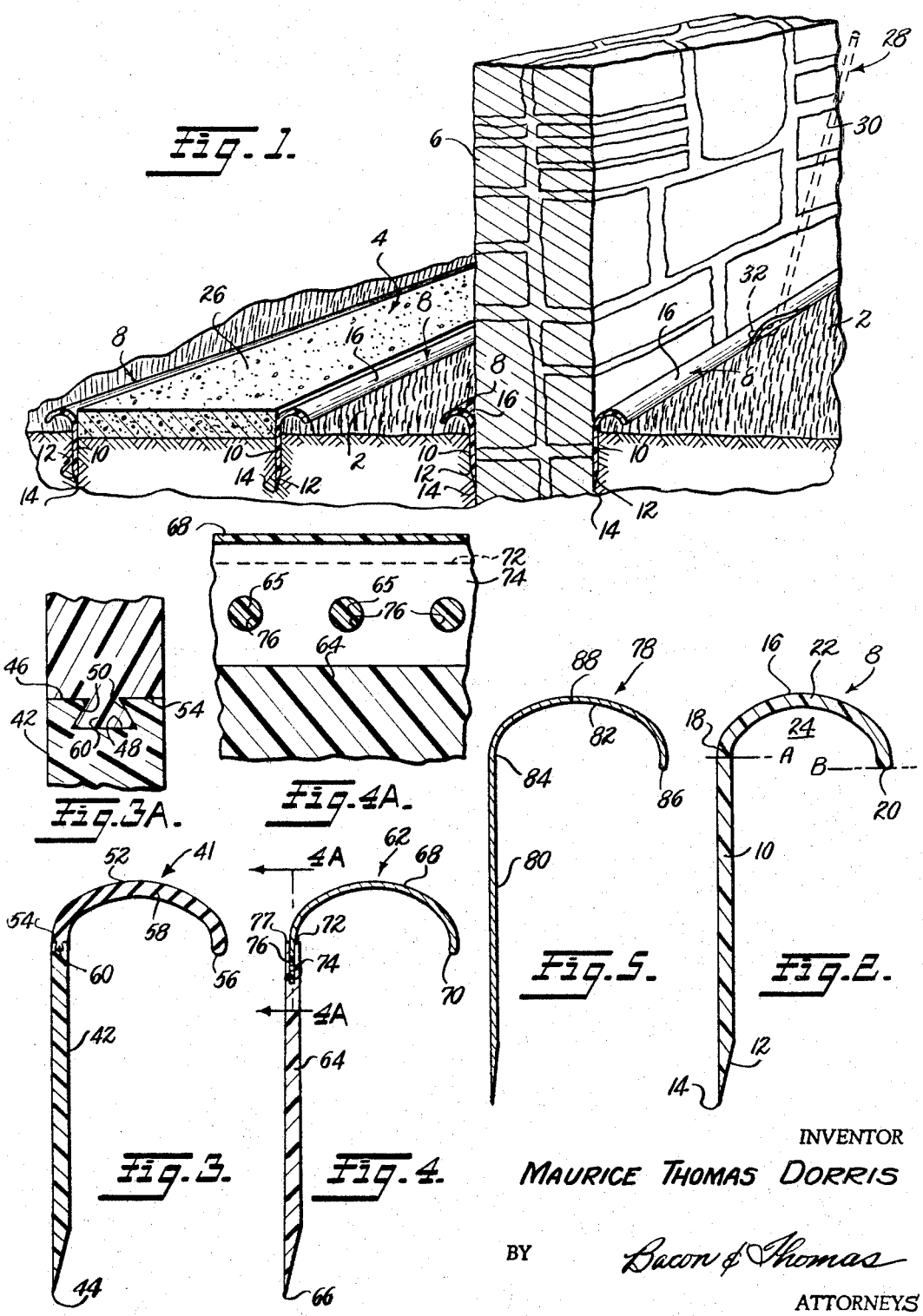

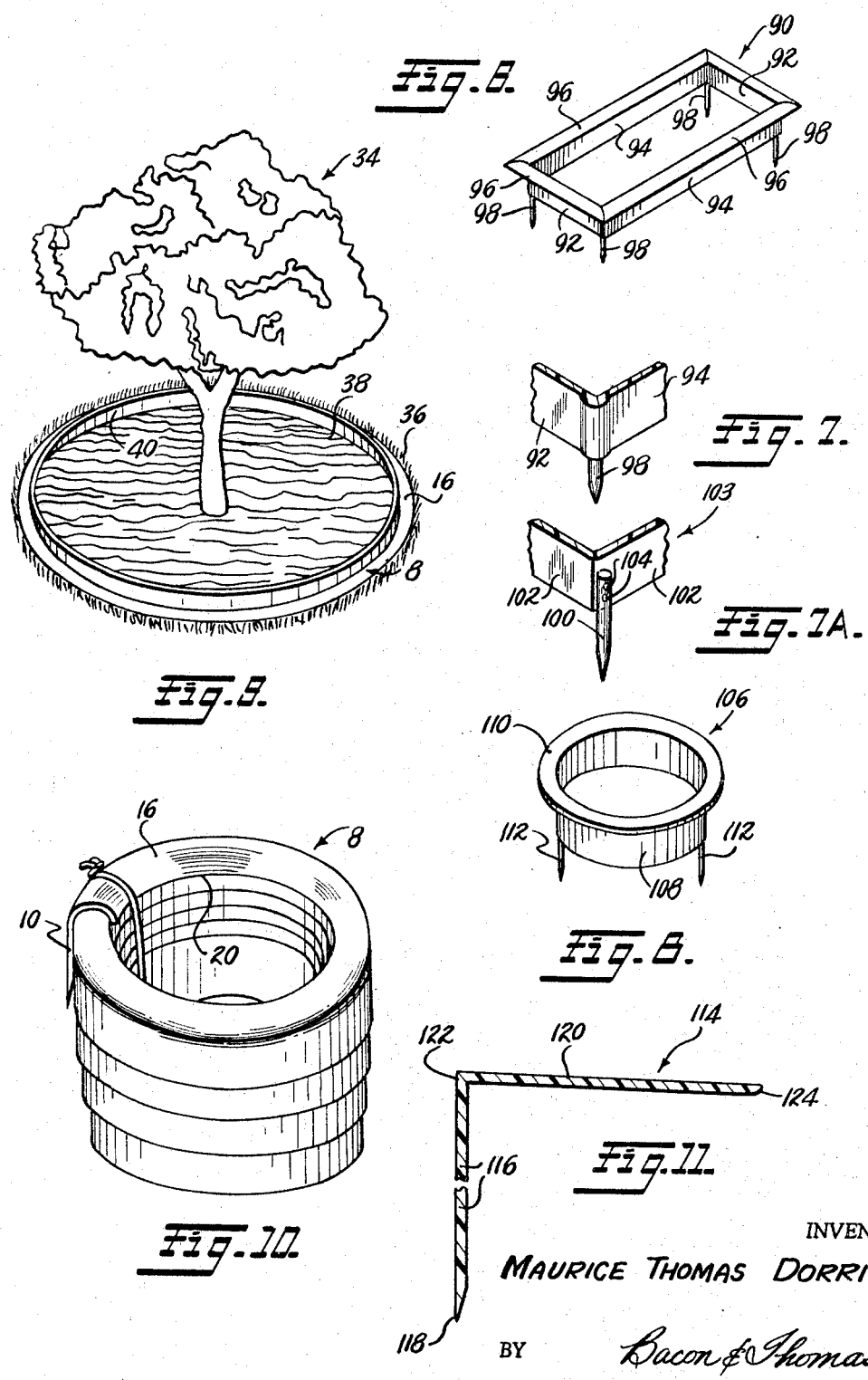

3,378,949
LAWN EDGING DEVICE
Maurice Thomas Dorris, 19702 Matsonia Ave.,
Huntington Beach, Calif. 92646
Filed Dec. 20, 1965, Ser. No. 514,904
10 Claims. (Cl. 47—33)

ABSTRACT OF THE DISCLOSURE

A lawn edging device comprising a vertical base strip to the upper end of which is attached a normally horizontally extending flange of resilient, flexible material. The base strip is pressed into the earth along the area to be edged. To edge the area, the outer edge of the flange is flexed upwardly a substantial distance to allow vegetation growing next to the flange to be placed therebeneath, after which the flange is released and allowed to resume its normal generally horizontal position.

---

This invention relates generally to lawn edging devices, and more specifically to a lawn edging device in the form of a strip or a pre-molded rectangular or other shape that can be pressed into the soil to establish a well defined straight or curved edge along a curb, sidewalk, wall, flower bed, etc., or around a given shaped object. Several embodiments are disclosed, each of which includes a flexible flange beneath which blades of grass and the like can be trapped or tucked to provide a neat, trimmed appearance.

A problem in maintaining an attractive lawn is to provide well defined and neatly trimmed edges adjacent to curbs, sidewalks, walls, flower beds and the like, and to prevent grass and other plants from creeping into areas where their presence is undesirable, or presents an untidy appearance. The ordinary lawn mower does a good job of clipping lawn grasses to a desired uniform height, but is ineffective in establishing sharply defined and well trimmed edges along the lawn, especially where the lawn abuts against a curb, sidewalk, wall or other structure. With regard to lawns which abut a wall, even one wheel lawn mowers are constructed in such a manner that it is impossible for them to cut blades of grass disposed immediately adjacent to the wall, or any other structure projecting upwardly from the lawn, and, hence, at least some overly tall plants normally remain after a lawn has been mowed.

The device of the invention includes an elongated vertical base strip that is pressed into the soil along a line where it is desired to form a well-defined edge on a lawn. The strip has a flexible, generally horizontally extending flange attached to the upper edge thereof. The edging device is easily installed where desired, by starting its leading edge into the ground and working progressively along the length of the strip to embed the same. As the vertical base strip is pressed into the earth, the flexible flange will trap the underlying grass, which eventually will die out. At the time of the initial installation and subsequently thereto, the flange may be lifted and blades of grass and the like adjacent to said strip can be tucked beneath the flange. Thus, a well-defined and neat appearing lawn edge is produced without the use of special mechanical lawn edging equipment, or hand trimming.

It is an object of the present invention to provide an easily installed device for forming a straight or curved edge along a lawn or the like, and which includes a flange portion beneath which blades of grass and other plants growing along said edge can be trapped or tucked to provide a neat, trimmed appearance.

Another object is to provide a lawn edging device incorporating a flexible flange that can be readily lifted to place blades of grass and other plants thereunder, and which will normally lie in a generally horizontal disposition to conceal underlying plants and thus provide a "trimmed" edge along a lawn.

A further object is to provide a lawn edging device that can be readily installed along either a straight or a curving line, or placed about an object of substantially any configuration, to provide a trim appearing lawn edge.

Still another object is to provide a lawn edging device that can be installed along walls and other structures which project upwardly from a lawn, to provide a neat appearing edge thereabout without the use of mechanical trimming equipment, and without requiring the manual cutting or removal of grass plants and the like growing immediately adjacent said structures.

It is also an object to provide a lawn edging device of the type described incorporating a vertical base strip and a flexible, generally horizontally extending flange, which is detachably connected to the upper edge of said base strip, and which can be removed when mowing the lawn and then replaced to provide a trim appearing edge along the mowed lawn.

Other objects and many of the attendant advantages of the present invention will be readily apparent from the following detailed description, when taken in connection with the accompanying drawings, wherein:

FIG. 1 is a perspective view, partially in cross section, showing the preferred embodiment of the lawn edging device installed along the opposite sides of a sidewalk and on either side of a stone wall, a tool for tucking blades of grass under the flange of the edging device being shown in broken lines;

FIG. 2 is an enlarged vertical sectional view of the preferred embodiment of the invention, wherein the flange is shown disposed in its normal, or undeflected, generally horizontal position;

FIG. 3 is a vertical sectional view of a first modification of the invention, wherein the inner edge of the generally horizontal flange is detachably connected to the top edge of the vertical strip by a conventional dove-tail joint;

FIG. 3A is an enlarged, fragmentary view showing the dove-tail joint of FIG. 3;

FIG. 4 is a vertical sectional view of another modification of the invention, wherein a non-metallic base strip is provided with a metallic flange;

FIG. 4A is an enlarged sectional view taken along the line 4A—4A in FIG. 4, showing the manner in which the metallic flange may be interlocked with the non-metallic vertical base strip;

FIG. 5 is a vertical sectional view of still another embodiment of the invention, similar to FIG. 2 except that the edging device is constructed entirely from metal;

FIG. 6 is a perspective view of yet another embodiment of the invention, wherein the edging device is preformed into a rectangular shape for installation about a head stone or other structure which projects upwardly from a lawn, said device including anchor stakes at the corners thereof;

FIG. 7 is a fragmentary, perspective view of one of the lower corners of the device of FIG. 6, showing an integrally molded stake;

FIG. 7A is a view similar to FIG. 7, but showing a modification wherein the anchor stake is detachably secured to the edging device by screws;

FIG. 8 is a perspective view of a circular edging device;

FIG. 9 is a view showing how the edging device of FIG. 1 can be installed around a hoop enclosing an area beneath a tree;

FIG. 10 is a perspective view showing a length of the edging device of FIG. 1 disposed in a coil for ready handling and storage; and FIG. 11 is a fragmentary vertical sectional view of still another embodiment of the invention.

Referring now to FIG. 1, a lawn is indicated generally at 2, and has a sidewalk 4 and a stone wall 6 installed thereon. Embedded along the opposite edges of the sidewalk 4 and along the opposite sides of the stone wall 6 are identical edging devices 8 constituting the preferred embodiment of the invention.

Referring to FIG. 2, one of the edging devices 8 is shown in vertical cross-section, and includes an elongated vertical base strip 10, which can be made in any desired height. The lower inner edge of the vertical strip 10 is beveled at 12 to provide a sharp edge 14, which facilitates penetration of the edging device 8 into the earth.

Extending generally horizontally from the top edge of the vertical base strip 10 is a concavo-convex, or semi-oval flange 16, which is formed integrally with the upper edge of the strip 10. The flange 16 originates at a point 18 lying in a plane A and terminates in a rounded free edge 20 lying in a plane B disposed a substantial distance (1/8" to 3/16") below the plane A. The edging device 8 is made from a suitable plastic, rubber, or other flexible and resilient non-metallic material, whereby the flange 16 can be easily flexed upwardly, and when released will reassume its normal, generally horizontal position. The flange 16, between the point 18 and the outer edge 20 thereof, has the general configuration of an arch, whereby a grass-receiving chamber 24 is formed therebeneath. The dimensions of the vertical base strip 10 and of the flange 16 can be varied, but by way of example, the strip 10 may be made about 1/8 inch thick and about 3 inches in height, and the flange 16 may extend horizontally for half that distance, or about 1½ inches, the height of the chamber 24 being about ½ inch.

In use, the vertical base strip 10 of the edging device 8 is pressed into the soil of the lawn 2, until the outer edge 20 of the flange 16 extends into the grass. When the edging device 8 is installed along the edges of a sidewalk, such as that shown at 4, the base strip 10 is preferably pressed into the earth until the outer, top-most surface of the flange 16 is disposed flush with, or slightly below, the top surface 26 of the sidewalk. When it has been pressed into the earth, the vertical base strip 10 defines a wall which tends to prevent the growth of grass and other plants into areas therebehind, and thus it establishes a well defined edge to the lawn 2.

After the vertical base strip 10 has been pressed into the soil, the flange 16 can be flexed upwardly by running the tool 28, FIG. 1, along the edge 20 so that the blades of grass adjacent thereto are tucked underneath the outer edge 20. As the flange 16 is released and assumes its normal, generally horizontal position, its presses down the blades of grass trapped under it, stifling their growth, and thereby providing a neat, trim appearing lawn edge.

The tool 28 may be made from round bar stock and comprises a handle portion 30 having a bent lower end 32 which can be easily inserted beneath the outer edge 20 of the flange 16, as shown. The lower end 32 of the tool 28 can be easily inserted under the outer flange edge 20, enabling the handle 30 of the tool to be maneuvered at an appropriate angle to successively tuck the blades of grass beneath the flange 16 as the tool is pulled along said edge. Of course, the flange 16 could be flexed upwardly manually by the fingers and released to entrap grass blades therebeneath, but this would be laborious and time consuming. The tool 28 can also be used to aid in lifting the strip out of the ground.

The edging device 8 can be installed either along a straight line, as in FIG. 1, or along a curved line, a typical example of the latter type of installation being shown in FIG. 9. Here, a tree 34 is shown surrounded by a lawn 36, with an area 38 beneath tree 34 encircled by an upstanding hoop 40, which can be of wood, brick, concrete or the like. In order to provide a neat appearing lawn edge about the upstanding hoop 40, a suitable length of the edging device 8 is installed thereabout. The edging device 8 is purposely designed so that it can be readily bent to conform to various curved lines, without any undesirable deformation or buckling of the flange 16 thereof. Because the outer edge 20 of the flange 16 extends a substantial distance below the inner edge 18 thereof when the flange is in its normal horizontal position, an over-center type relationship is established, causing the flange 16 to bend or curl downwardly under tension in any region where the vertical strip 10 is bent inwardly to conform to a gentle lawn border curvature. If the outer edge 20 were disposed in the same horizontal plane as its inner edge 18, or in particular thereabove, the outer edge of the flange 16 would tend to distort or buckle upwardly under tension, or be otherwise adversely deformed, when the edging device 8 was bent inwardly to conform to a curve.

The edging device 8 can be easily coiled for storage and to facilitate handling thereof in shipment, as is illustrated in FIG. 10. The spacing of the outer edge 20 of the flange 16 beneath its inner edge 18 causes the flange 16 to deflect downwardly to better accommodate coiling. The edging device 8 can be made green in color to blend with the color of the lawn 2, or it can be of some other color, chosen to blend or contrast with the color of the lawn, flower bed, or other area being edged.

Referring now to FIG. 3 and 3A, an embodiment of the invention is shown at 41 wherein a generally horizontal flange is detachably connected to a vertical base strip. Thus, a vertical base strip 42 is provided having a sharp lower, beveled edge 44, and a horizontal top edge 46 having a longitudinally extending, dove-tail groove 48 formed therein, said groove having inwardly diverging side walls 50.

A flange 52, generally similar to the flange 16, is detachably connected to the vertical strip 42, and includes an inner edge 54, an outer free edge 56, which lies vertically below the plane of the inner edge 54 when the flange 52 is in its normal, unflexed condition, and an arched body portion 58 extending between the edges 54 and 56. The inner edge 54 carries a longitudinally extending rib 60 thereon, shaped complementary to the groove 48. The vertical strip 42 and the flange 52 are made of a resilient, flexible plastic or other suitable material, whereby the rib 60 can be snapped into the groove 48 to detachably secure the flange 52 to the vertical strip 42.

There are several important advantages afforded by the edging device 41 in FIGS. 3 and 3A, one being that the flange 52 and the base strip 42 can be made from different materials. Further, the vertical base strip 42 can be installed while the flange 52 is detached therefrom, which in some instances will make for easier installation. In this instance, the flange 52 will be mounted after the vertical base strip 42 has been embedded to the desired depth. Another advantage is that the flange 52 can be removed during mowing of the lawn and then replaced, which procedure eliminates the possibility of the flange 52 being damaged by the lawn mower.

Another embodiment of the invention is illustrated at 62 in FIGS. 4 and 4A, wherein a vertical base strip 64 molded of rubber, plastic or a like material is shown, having a beveled lower edge 66. A metallic flange 68, preferably made of a thin resilient metal such as stainless steel, is attached to the strip 64, and includes an outer edge 70 and an inner edge 72, the latter having a flat, integral extension 74 projecting downwardly therefrom and which is embedded within the upper portion of the vertical base strip 64. As is shown in FIG. 4A, the extension 74 on the flange 68 has a plurality of spaced openings 76 through which the material of the molded, non-metallic vertical base strip 64 extends to establish an interlock therebetween. The free outer edge 70 of the metallic flange 68 is disposed in a plane vertically below the inner edge 72 thereof, and beneath the top edge 77 of the non-metallic base strip 64, whereby the flange 68 will always deflect downwardly under tension, like the flange 16, when the vertical base strip 64 is bent to conform to a desired curvature.

If desired, the openings 76 providing the interlock feature between the base strip 64 and the flange 68 of the edging device 62 can be eliminated, in which instance the flange 68 would extend into a molded groove and be installed on and removed from the base strip 64 in a manner similar to that in which flange 52 is installed on and removed from the vertical base strip 42.

Another embodiment of the invention is shown at 78 in FIG. 5, which is identical in configuration to the edging device 8 of FIG. 2, except that the material thereof is metal. The edging device 78 is preferably made from a suitable resilient stainless steel, and includes a vertical strip 80 formed integrally with a generally horizontal flange 82, the latter including an inner edge 84 and an outer edge 86. The flange edges 84 and 86 are joined by an arch portion 88, and the outer edge 86 is disposed vertically below the base edge 84, for the purpose previously described.

The edging devices 8, 41, 62 and 78 are all installed in substantially the same manner, and each functions as described with respect to providing a well defined and neat appearing edge to the lawn 2, or to any other ground area which it is desired to edge. While the edging devices can be bent or curved to fit about various objects, it is desirable in some instances, especially for smaller objects such as bird baths, grave markers or headstones, etc., to provide a preformed edging device made in a size to fit closely about the object.

Referring to FIG. 6, a generally rectangular preformed edging device 90 is shown for installation about a rectangular object, such as a grave marker, or the like, said device being similar in construction to the edging device 8 except that it is preformed into a closed loop configuration. The edging device 90 comprises vertical end and side base strips 92 and 94, respectively, formed integrally with each other and arranged to define a rectangle of the desired size. Projecting generally horizontally from the top edge of the strips 92 and 94 are flanges 96, which correspond to and are of the same configuration as the flange 16 in FIGS. 1 and 2. The preformed edging device 90 is preferably molded from a flexible non-metallic material, such as durable plastic, and is installed about an object in much the same manner as the edging device 8.

In instances where more effective anchoring is desired, the device 90 is provided with a downwardly projecting, pointed anchor stake 98 at each of its corners. As is shown in FIG. 7, the stakes 98 are formed integrally with the corners of the rectangular preformed edging device 90, and function to ensure that said device will remain more firmly anchored in its installed position.

The anchor stakes 98 need not be molded integrally with the edging device 90, but can be separately formed and then secured thereto. Such an arrangement is shown in FIG. 7A, wherein a separately formed stake 100 is shown attached to the exterior of the vertical base strips 102 of a rectangular, preformed edging device 103 by screws 104. If desired, the edging devices 8, 41, 62 and 78 can also be fitted with spaced anchor stakes, like either the integral stakes 98 or the separately formed stakes 100.

The edging device can also be made in a preformed circular configuration, as shown at 106 in FIG. 8, wherein the edging device 106 includes a vertical base strip 108 having an upper edge to which is attached an annular flange 110, which is constructed like the flange 16 in FIGS. 1 and 2. To further secure the edging device 106 in position, a plurality of downwardly extending, integrally or separately formed anchor stakes 112 are attached to the vertical base strip 108.

Another embodiment of the edging device of the invention is shown at 114 in FIG. 11, incorporating a vertical base strip 116 corresponding to the base strip 18, and which terminates in a beveled lower edge 118. Projecting generally, but not truly, horizontally from the top edge of the base strip 116 is a planar flange 120, including an inner edge 122 formed integrally with the top edge of the base strip 116, and an outer edge 124, which is vertically spaced below the inner edge 122, so that the edging device 114 can be installed along a curved line in the same manner, and with the same advantages as the edging device 8. The edging device 118 is especially suitable for installing along walls and foundations, in that the flat top surface of the flange 120 provides a surface upon which the wheels on one side of a lawn mower may be driven, the width of the flange 120 being chosen so that when a lawn mower is moved therealong the grass adjacent the outer edge 124 will be cut. The device 118 is made from a suitable resilient material so that the flange 120 can be deflected upwardly to tuck grass and the like thereunder by using the tool 28, and so that when released the flange will return to its normal, generally horizontal position.

The various embodiments of the invention are all economical to construct, easy to install, and with normal care will afford long use. Obviously, many modifications and variations of the invention are possible in the light of the above teachings. It is, therefore, to be understood that, within the scope of the appended claims, the invention can be practiced otherwise than specifically described and illustrated.

I claim:

1. A device for edging lawns and the like, comprising: an elongated, flexible, generally vertical base strip having a lower edge to be pressed into the earth; and a normally generally horizontally extending continuous flange attached along its inner edge to the top edge of said strip with its outer edge free, said flange being flexible and resilient, whereby when said strip has been pressed into the earth the free outer edge of said flange can be flexed upwardly from its normal horizontal position a substantial distance to allow blades of grass and the like growing next to said free outer edge of said flange to be placed or assume a position under said flange, afterwhich said resilient flange is released whereby it returns to said normal horizontal position to impart a trimmed appearance to said lawn.

2. A lawn edging device as recited in claim 1, wherein the flange is formed integrally with the base strip.

3. A lawn edging device as recited in claim 1, wherein the free outer edge of the flange lies in a plane spaced vertically below the top edge of the base strip and the inner edge of said flange, when said flange is in its normal, generally horizontal disposition.

4. A lawn edging device as recited in claim 1, wherein the portion of the flange between its inner attached edge and its outer free edge has the configuration of an arch.

5. A lawn edging device as recited in claim 1, wherein the flange, between its inner edge and its free outer edge, is generally planar, and said free edge is disposed a substantial distance vertically below said inner edge when said flange is in its normal, generally horizontal disposition.

6. A lawn edging device as recited in claim 1, wherein the flange is formed separately from and is secured to the base strip.

7. A lawn edging device as recited in claim 6, wherein the inner edge of the flange is attached to the top edge of the base strip by a groove in one of said edges and a rib on the other of said edges.

8. A lawn edging device as recited in claim 1, wherein the strip top edge has an elongated groove therein and the inner end of the flange has an extension thereon receivable within said groove to detachably secure together said base strip and said flange.

9. A lawn edging device as recited in claim 1, wherein the base strip and the flange define a preformed closed loop of given geometric shape for edging about an object of like geometric shape.

10. A lawn edging device as recited in claim 9, wherein the base strip has a plurality of downwardly projecting anchor stakes extending therefrom.

References Cited

UNITED STATES PATENTS

| | | | |
|---|---|---|---|
| 253,186 | 2/1882 | Cogswell | 47—33 |
| 606,151 | 6/1898 | Johnson | 47—33 |
| 1,139,515 | 5/1915 | Haas. | |
| 1,977,021 | 10/1934 | Spencer | 47—33 |
| 2,713,751 | 7/1955 | Hendrixson | 47—33 |
| 2,782,561 | 2/1957 | Smith | 47—33 X |

ROBERT E. BAGWILL, *Primary Examiner.*